United States Patent
Park et al.

(10) Patent No.: US 10,306,546 B2
(45) Date of Patent: May 28, 2019

(54) METHOD FOR TRANSMITTING DOWNLINK CONTROL INFORMATION AND DEVICE THEREFOR

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/544,363

(22) PCT Filed: Jan. 18, 2016

(86) PCT No.: PCT/KR2016/000494
§ 371 (c)(1),
(2) Date: Jul. 18, 2017

(87) PCT Pub. No.: WO2016/117885
PCT Pub. Date: Jul. 28, 2016

(65) Prior Publication Data
US 2018/0115943 A1    Apr. 26, 2018

(30) Foreign Application Priority Data

Jan. 19, 2015  (KR) .................. 10-2015-0008486
Sep. 24, 2015  (KR) .................. 10-2015-0135899
Jan. 15, 2016  (KR) .................. 10-2016-0005012

(51) Int. Cl.
*H04W 48/16*  (2009.01)
*H04W 74/08*  (2009.01)
*H04W 76/20*  (2018.01)
*H04W 4/029*  (2018.01)
(Continued)

(52) U.S. Cl.
CPC .......... *H04W 48/16* (2013.01); *H04W 4/029* (2018.02); *H04W 8/005* (2013.01); *H04W 68/00* (2013.01);
(Continued)

(58) Field of Classification Search
CPC ..................................................... H04W 48/16
(Continued)

(56) References Cited

U.S. PATENT DOCUMENTS

2012/0281576 A1\* 11/2012 Yamada ............... H04L 1/0046
370/252
2014/0254420 A1  9/2014 Kim et al.
(Continued)

FOREIGN PATENT DOCUMENTS

WO    2014/165678 A2    10/2014
WO    2014/185660 A1    11/2014

OTHER PUBLICATIONS

Nokia Networks et al., "Design of Common Control Messages for MTC", R1-144996, 3GPP TSG-RAN WG1 Meeting #79, San Francisco, USA, Nov. 17-21, 2014, pp. 1-4.
(Continued)

*Primary Examiner* — Joel Ajayi
(74) *Attorney, Agent, or Firm* — IP Legal Services, LLC

(57) ABSTRACT

Provided are a method and a device for configuring a common search space (CSS) for a user equipment supporting a coverage enhancement operation or a low complexity user equipment (UE) category/type for a machine type communication (MTC) operation. The method may include monitoring a common search space configured according to types of common control information; and receiving the common control information transmitted through the common search space.

3 Claims, 6 Drawing Sheets

(51) Int. Cl.
  *H04W 8/00* (2009.01)
  *H04W 68/00* (2009.01)
  *H04W 74/00* (2009.01)
  *H04W 48/12* (2009.01)

(52) U.S. Cl.
  CPC ..... *H04W 74/006* (2013.01); *H04W 74/0833* (2013.01); *H04W 76/20* (2018.02); *H04W 48/12* (2013.01)

(58) Field of Classification Search
  USPC ........................................................ 455/434
  See application file for complete search history.

(56) References Cited

U.S. PATENT DOCUMENTS

| | | |
|---|---|---|
| 2014/0307560 A1 | 10/2014 | Kim et al. |
| 2016/0043849 A1 | 2/2016 | Lee et al. |
| 2016/0088595 A1 | 3/2016 | You et al. |
| 2016/0119900 A1 | 4/2016 | You et al. |
| 2016/0316462 A1 | 10/2016 | Kim et al. |

OTHER PUBLICATIONS

NTT DOCOMO, "Design of EPDCCH search space for low cost MTC", R1-144964, 3GPP TSG RAN WG1 Meeting #79, San Francisco, USA, Nov. 17-21, 2014, pp. 1-4.
LG Electronics, "Rel-12 agreements on PSS/SSS, PBCH and PRACH for MTC", R1-144896, 3GPP TSG RAN WG1 Meeting #79, San Francisco, USA, Nov. 17-21, 2014, pp. 1-5.

\* cited by examiner

METHOD FOR TRANSMITTING DOWNLINK CONTROL INFORMATION AND DEVICE THEREFOR

CROSS REFERENCE TO RELATED APPLICATIONS

This application is a National Stage Patent Application of PCT International Patent Application No. PCT/KR2016/000494 (filed on Jan. 18, 2016) under 35 U.S.C. § 371, which claims priority to Korean Patent Application Nos. 10-2015-0008486 (filed on Jan. 19, 2015), 10-2015-0135899 (filed on Sep. 24, 2015), and 10-2016-0005012 (filed on Jan. 15, 2016), the teachings of which are incorporated herein in their entireties by reference.

TECHNICAL FIELD

The present disclosure relates to a method of transmitting and receiving downlink control information and an apparatus therefor. More particularly, the present disclosure relates to a method and an apparatus for configuring a Common Search Space (CSS) for a low complexity user equipment (UE) category/type for a Machine Type Communication (MTC) operation or a UE supporting a coverage enhancement operation.

BACKGROUND ART

Machine Type Communication (hereinafter, referred to as "MTC") is one type of data communication and refers to device to device communication or machine to machine communication in which one or more entities communicate each other without human interaction. The MTC that does not require the human interaction denotes all types of communication schemes in which communication is performed without intervention of a human during a communication process.

An MTC UE may be installed in a place with a bad propagation environment compared to a normal UE. In this case, it may be necessary to repeatedly transmit control information and/or data of each physical channel through a plurality of subframes, which were used to be transmitted only in the unit of one subframe.

Meanwhile, the MTC UE may have different required coverage enhancement levels according to a wireless channel environment, and the number of repetitive transmissions or transmission power may be differently configured according to a plurality of coverage enhancement levels within one cell.

In this case, if the same common search space is configured for MTC UEs that have various coverage enhancement levels and are located within one cell, radio resources may be used inefficiently due to repetitive transmissions.

DETAILED DESCRIPTION OF THE INVENTION

Technical Problem

As described, the present disclosure proposes a method and an apparatus for separately transmitting common control information according to each coverage enhancement level within a predetermined cell in a case of an MTC UE supporting the coverage enhancement.

Further, with respect to common control information for the MCT UE, the present disclosure proposes a method and an apparatus for configuring a separate common search space according to each type of common control information.

Technical Solution

To solve the technical problem, a method may be provided for receiving control information by an MTC UE in accordance with at least one embodiment. The method includes: monitoring a common search space configured according to each type of common control information; and receiving common control information transmitted through the common search space.

In accordance with another embodiment, a method may be provided for transmitting control information by a BS. The method includes: configuring a common search space for transmission of common control information of an MTC (Machine Type Communication) UE; and transmitting the common control information through the common search space, wherein the common search space is configured to be common control information type-specific.

In accordance with still another embodiment, an MTC UE may be provided for receiving control information. The MTC UE includes: a controller configured to monitor a common search space configured to be common control information type-specific; and a receiver configured to receive the common control information transmitted through the common search space.

The present disclosure provides a BS for transmitting control information. The BS includes: a controller configured to a common search space for transmission of common control information of an MTC (Machine Type Information) UE; and a transmitter configured to transmit the common control information through the common search space, wherein the common search space is configured for each type of the common control information.

Effects of the Invention

In accordance with the embodiments of the present disclosure, a method and an apparatus may be provided for separately transmitting common control information according to a coverage enhancement level within a predetermined cell in a case of an MTC UE supporting the coverage enhancement.

Further, with respect to common control information for the MTC UE, a method and an apparatus may be provided for configuring a separate common search space according to the type of common control information in accordance with another embodiments.

MODE FOR CARRYING OUT THE INVENTION

Figure 1:
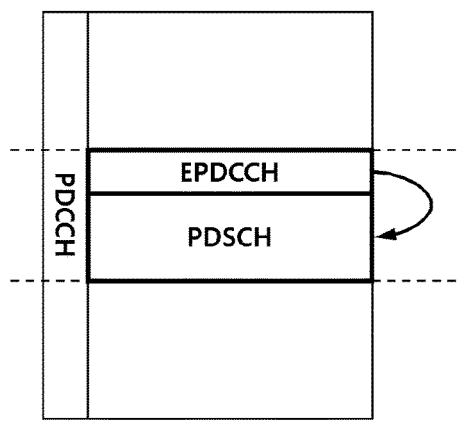
FIG. 1 illustrates a physical downlink control channel (PDCCH) and an Enhanced physical downlink control channel (EPDCCH) for transmitting downlink control information.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, a MTC terminal refers to a terminal that is low cost (or is not very complexity), a terminal that supports coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed so as to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station 20 or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell, and thus, the base station may be construed in two ways. i) the base station may be a device itself that provides a megacell, a macrocell, a microcell, a picocell, a femtocell, and a small cell in association with a wireless area, or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. In ii), a wireless area itself that receives or transmits a signal from a perspective of a terminal or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields in which the technical idea of the present disclosure is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, so as to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

FIG. 1 illustrates a physical downlink control channel (PDCCH) and an enhanced physical downlink control channel (EPDCCH) for transmitting downlink control information.

Referring to FIG. 1, the PDCCH and the EPDCCH are defined as physical control channels for transmitting Downlink Control Information (DCI) for a UE in a 3GPP LTE/LTE-Advanced system.

For example, a UE accessing a predetermined cell monitors i) a UE-specific Search Space (USS) defined in the PDCCH or the EPDCCH and ii) a Common Search Space (CSS) defined in the PDCCH. For example, the UE may receive UE-specific downlink control information scrambled with a C-RNTI (Cell-Radio Network Temporary Identifier) and cell-specific downlink control information scrambled with an SI-RNTI (System Information-Radio Network Temporary Identifier), a P-RNTI (Paging-Radio Network Temporary Identifier), and an RA-RNTI (Random Access-Radio Network Temporary Identifier). Further, an LTE/LTE-Advanced UE in an idle state may also monitor a CSS of a cell currently camped on, so as to receive scheduling information of a paging message for the corresponding UE or scheduling information of system information of the corresponding cell and receive the corresponding paging message and system information based on the received scheduling information.

Specifically, for example, the UE monitors DCI including scheduling information of SIB (System Information Block) transport resources that are CRC-scrambled with an SI-RNTI and transmitted through a CSS including a $0^{th}$ CCE (Control Channel Element) to a $15^{th}$ CCE of the PDCCH, DCI including scheduling information of a paging message that is CRC-scrambled with a P-RNTI and transmitted, and DCI including scheduling information of an RAR (Random Access Response) message that is CRC-scrambled with an RA-RNTI and transmitted. In addition, for a UE fallback operation, the UE monitors DCI format 0/1A scrambled with a C-RNTI of the corresponding UE including scheduling information of a PDSCH/PUSCH.

Furthermore, each UE monitors UE-specific DCI scrambled with the C-RNTI of the corresponding UE including scheduling information of the PDSCH/PUSCH through the USS defined through the PDCCH or the EPDCCH.

As described with reference to FIG. 1, the typical UE monitored the CSS to receive the common control information and monitored the USS to receive UE-specific control information. However, when there are a plurality of MTC UEs having various coverage enhancement levels within a predetermined cell, and when the MTC UEs receive various types of common control information through a single CSS, radio resources are unnecessarily wasted due to repetitive transmission. Accordingly, the present disclosure proposes a method of configuring the CSS to be separated according to each type of common control information and an apparatus for the same.

First, an MTC UE to which the present disclosure can be applied will be described hereinafter in detail.

[Low Complexity UE Category/Type for MTC Operation]

As an LTE network spreads, a mobile communication service provider desires to minimize the number of RATs (Radio Access Terminals) to reduce maintenance costs of the network. However, MTC products based on the typical GSM/GPRS network have increased, and MTC using a low data transmission rate may be provided with low costs. Accordingly, the mobile communication service provider uses the LTE network for normal data transmission and uses the GSM/GPRS network for MTC, thereby generating a problem in that two RATs should be individually managed, which causes the inefficient use of frequency bands.

In order to solve the problem, the MTC UE using the LTE network should be replaced with a cheap MTC UE using the GSM/EGPRS network. Thus, it is required to define the low complexity UE category/type reflecting various requirements for reducing costs of the LTE MTC UE and the standard technology for supporting the same.

Further, about 20% of MTC UEs that support an MTC service such as smart metering are installed in a "Deep indoor" environment such as a basement, so that the coverage of the LTE MTC UE should be improved by about 15 dB compared to the coverage of the typical normal LTE UE for successful MTC data transmission. In addition, the coverage of the LTE MTC UE should be improved by about 15 dB or more in consideration of a performance reduction due to the introduction of the low complexity UE category/type for the MTC operation.

As described, in order to improve the coverage while reducing the costs of the LTE MTC UE, various methods such as PSD boosting or a low coding rate and time domain repetitive transmission are considered for each physical channel.

For example, requirements of the low complexity UE category/type for the MTC operation are as follows.

Reduced UE bandwidth of 1.4 MHz in downlink and uplink.

Bandwidth reduced UEs should be able to operate within any system bandwidth.

Frequency multiplexing of bandwidth reduced UEs and non-MTC UEs should be supported.

The UE only needs to support 1.4 MHz RF bandwidth in downlink and uplink.

Reduced maximum transmit power.

Reduced support for downlink transmission modes.

further UE processing relaxations

Reduced maximum transport block size for unicast and/or broadcast signaling.

Reduced support for simultaneous reception of multiple transmissions.

Relaxed transmit and/or receive EVM requirement including restricted modulation scheme. Reduced physical control channel processing (e.g. reduced number of blind decoding attempts).

Reduced physical data channel processing (e.g. relaxed downlink HARQ time line or reduced number of HARQ processes).

Reduced support for CQI/CSI reporting modes.

Target a relative LTE coverage improvement—corresponding to 15 dB for FDD—for the UE category/type defined above and other UEs operating delay tolerant MTC applications with respect to their respective nominal coverage.

Provide power consumption reduction for the UE category/type defined above, both in normal coverage and enhanced coverage, to target ultra-long battery life:

For convenience of the description, the typical LTE UE is referred to as a normal LTE UE, and a new low complexity UE category/type that meets a condition for the MTC operation is referred to as an MTC UE in the present disclosure. Further, a normal LTE UE or an MTC UE that supports a coverage enhancement function or mode is referred to as a CE (Coverage Enhanced) UE as necessary.

[Narrowband Definition]

The MTC UE can perform transmission/reception only in 1.4 MHz (that is, 6 PRBs) through a predetermined subframe regardless of a system bandwidth. Accordingly, in a predetermined uplink/downlink link subframe, a transmission/reception band of a predetermined MTC UE is defined, a "narrowband" including 6 successive PRBs is defined as a unit for allocating the transmission/reception band, and includes $$NB_{whole} = \left\lfloor \frac{N_{RB}^{DL}}{6} \right\rfloor$$

downlink narrowbands and $$NB_{whole} = \left\lfloor \frac{N_{RB}^{UL}}{6} \right\rfloor$$

uplink narrowbands. Here, $N_{RB}^{DL}$ denotes the number of downlink resource blocks, and $N_{RB}^{UL}$ denotes the number of uplink resource blocks.

Meanwhile, when the narrowbands are configured in a predetermined system bandwidth, the narrowbands may be configured by placing the remaining RB(s) corresponding to the remainder after all PRBs included in the corresponding system bandwidth are divided by 6 at both band edges of the system band, at the center of the system band, or at both edges and the center of the system band and tying together the PRBs except for the remaining RB(s) in the unit of 6 successive PRBs by the increasing PRB number.

Hereinafter, a downlink control channel (hereinafter, referred to as an M-PDCCH) according to at least one embodiment will be described. Such a downlink control channel is used to transmit downlink control information of the MTC UE in accordance with at least one embodiment.

[Physical Downlink Control/Data Channel for MTC]

In the typical system equal to or lower than 3GPP LTE/LTE-Advanced Rel 12, a PDCCH and an EPDCCH have been defined as a downlink control channel for transmitting/receiving DCI. Particularly, in the system equal to or lower than Rel 10, the UE receives a downlink control channel through a PDCCH transmitted through first 1 to 3 OFDM symbols (2 to 4 OFDM symbols in a case where the system bandwidth is 1.4 MHz) in all downlink subframes.

Additionally, the EPDCCH corresponding to a new downlink control channel has been defined in 3GPP LTE/LTE-Advanced Rel 11, so that a predetermined UE can receive downlink control information through the PDCCH or the EPDCCH according to settings of a Base Station (BS).

Basically, in the LTE/LTE-Advanced system, the reception of the downlink control information is performed in a blind detection scheme through monitoring of a plurality of PDCCH candidates or EPDCCH candidates of the UE. To this end, the definition has been made such that a predetermined LTE/LTE-Advanced UE i) monitors a CSS (Common Search Space) and a USS (UE-specific Search Space) including a plurality of PDCCH candidates through a PDCCH area or ii) monitors a USS including a plurality of EPDCCH candidates through an EPDCCH area. At this time, each PDCCH candidate or each EPDCCH candidate may consist of a set of CCEs (Control Channel Elements) or ECCEs (Enhanced Control Channel Elements) which correspond to basic transmission units of the PDCCH and the EPDCCH. The corresponding spaces (CSS and USS) have been defined such that a predetermined UE monitors PDCCH candidates or EPDCCH candidates having a plurality of different aggregation levels to apply link adaptation to downlink control information transmission/reception.

However, unlike the typical PDCCH/EPDCCH in which transmission is performed through a single downlink subframe, an M-PDCCH corresponding to a downlink control channel for the MTC UE newly defined in Rel 13 requires repetitive transmission through a plurality of downlink subframes for coverage enhancement. Accordingly, in a case of the M-PDCCH, a domain of the number R of repetitive transmissions may be added for link adaptation besides the typical aggregation levels M={1,2,4,8,16,32}, L={1,2,4,8} for PDCCH). That is, predetermined M-PDCCH candidates may be defined as a set of i) an aggregation level L defined as the number of CCEs (or M-CCEs) used for corresponding M-PDCCH transmission in a single downlink subframe and ii) a number R of repetitions defined as the number of downlink subframes through which the repetitive transmissions are performed. That is, the predetermined M-PDCCH candidates may be defined as {L,R}, and each MTC UE may monitor a plurality of M-PDCCH candidates having different L and R according to a coverage level.

Similarly, in downlink data channel (PDSCH) transmission/reception for the MTC UE, the PDSCH for a predetermined MTC UE may be repeatedly transmitted through a plurality of downlink subframes for coverage enhancement. To this end, for each MTC UE, the BS may configure a set of PDSCH repetition levels of the PDSCH for designating the number of repetitive transmissions of the PDSCH through UE-specific RRC signaling according to a coverage level to which the corresponding UE belongs and dynamically signal a repetition level value to be applied to the corresponding PDSCH through DCI including PDSCH assignment information. Here, the repetition level value to be applied to the PDSCH may be determined according to the PDSCH repetition level to be applied in the set of repetition levels.

Additionally, a downlink wireless channel for the MTC UE such as an M-PDSCH or a PDSCH or a downlink subframe through which a downlink wireless signal can be transmitted/received (valid subframe for DL transmission) may be also configured to be cell-specific by the BS through MTC-SIB1 and broadcasted to MTC UEs within the corresponding cell. That is, the aforementioned M-PDCCH candidates or PDSCH transmission may be performed only through a DL valid subframe configured through corresponding MTC-SIB1.

Meanwhile, a CE UE may have different levels of coverage enhancement required according to a wireless channel environment. For example, a CE UE-specific coverage level required according to a wireless channel environment may be defined. A separate repetition technique or power boosting may be applied to each coverage level. As described above, when a plurality of coverage levels are defined in one cell and it is defined to transmit a wireless control channel/ wireless data channel by applying a separate repetition level and/or power boosting to each coverage level, it may be efficient to separately transmit a paging message, an RAR, and an SIB according to a coverage level of the corresponding UE even though UEs are included in one cell.

To this end, it is required to define a separate CSS for MTC UEs included in their respective levels within a predetermined cell supporting a coverage enhancement mode (or function) and to transmit scheduling information of the corresponding paging message, RAR message, and SIB transmission based on the definition.

The present disclosure proposes a CSS configuration method and apparatus for the MTC UE (or CE UE). Particularly, as an MTC UE supporting a reception bandwidth of 1.4 MHz and a method of supporting coverage enhancement for the same, a method and an apparatus for configuring a CSS for the corresponding MTC UE and CE UE are proposed when a separate control area for the corresponding MTC UE and CE UE is defined through a PDSCH area. Further, in the present disclosure, a coverage level of each MTC UE or CE UE may be determined according to a coverage enhancement performance improvement level required for convenience of the description, and a uplink/downlink wireless channel transmission method for the corresponding UE may be determined according to the coverage level to which the corresponding MTC UE or CE UE belongs. That is, the number of repetitive transmissions or a power boosting level for the corresponding UE may be determined according to the coverage level to which the corresponding MTC UE or CE UE belongs and the type of transmitted/received wireless channel (for example, a PDCCH, an EPDCCH, a PDSCH, a PUCCH, a PRACH, a PUSCH, and the like). Further, it is assumed that the number of coverage levels supported within a predetermined cell is N (N is a random natural number) in the present disclosure. That is, MTC or CE UEs belonging to the corresponding cell are distributed within coverage level 0 to coverage level N−1. However, the N value is assumed for the description, and elements for determining the N value or the coverage level are not limited.

Figure 2:
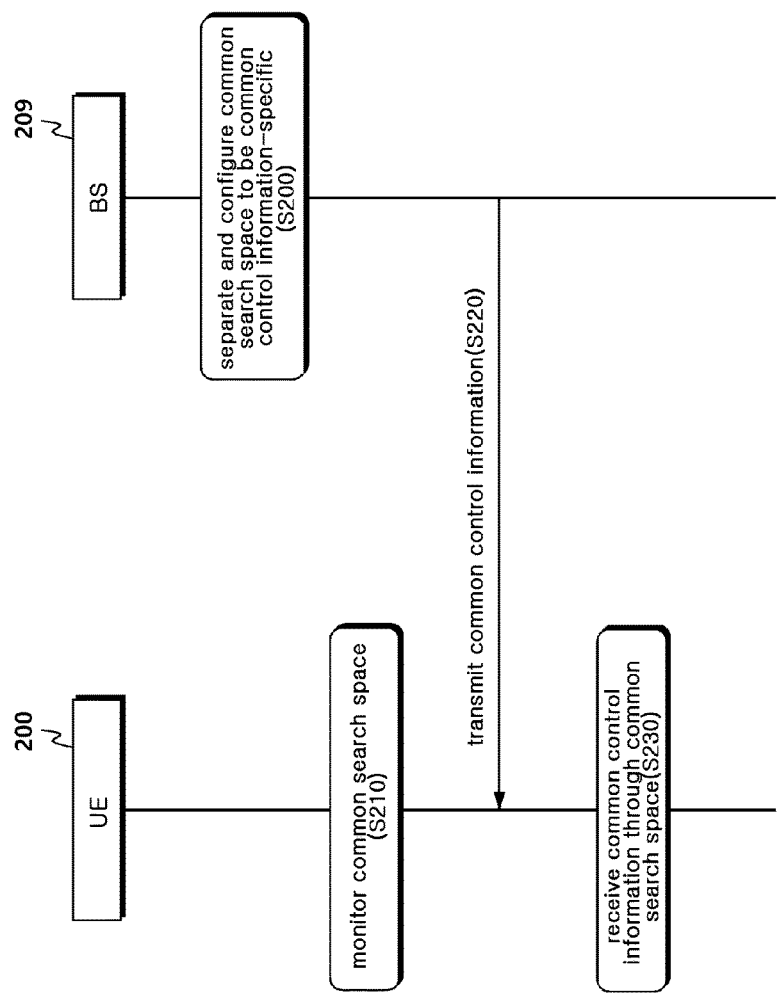
FIG. 2 is a signal diagram illustrating a signal flow between a user equipment (UE) and a base station (BS) according to an embodiment of the present disclosure.

FIG. 2 is a signal diagram illustrating a signal flow between a user equipment (UE) and a base station (BS) according to an embodiment of the present disclosure.

An MTC UE of the present disclosure may identify downlink control information by performing operations of monitoring a common search space configured for each type of common control information and receiving the common control information transmitted through the common search space. Further, the BS may perform operations of configuring the common search space for transmitting the common control information of the MTC UE and transmitting the common control information through the common search space, and the common search space may be configured for each type of common control information and downlink control information for the MTC UE may be transmitted therethrough.

Referring to FIG. 2, a BS 209 may separate and configure a common search space to be common control information-specific in S200. For example, in order to transmit common control information for the MTC UE, the BS 209 may separately configure the common search space (CSS), to be monitored by a UE 200 to transmit the corresponding common control information, to be common control information-specific. For example, the BS 209 may separately configure a common search space for transmitting common control information including scheduling information of a paging message and a common search space for transmitting common control information including scheduling information of a random access response message. In another example, the BS 209 may configure a cell-specific common search space for paging. In still another example, the BS 209 may separate and configure a common search space for a random access response to be PRACH repetitive transmission level-specific. That is, the common search space for the random access response may be configured to be separated according to each repetition level of the MTC UE.

Meanwhile, the UE 200 monitors the common search space configured to be separated according to each piece of common control information by the BS 209 in S210. As described above, the UE 200 monitors a first common search space to receive common control information including scheduling information of a paging message and monitors a second search space to receive common control information including scheduling information of a random access response message. That is, the UE 200 performs monitoring in each common search space configured to be separated according to each piece of common control information.

The BS 209 transmits the common control information through the common search space configured to be common control information-specific in S220. For example, the BS 209 identifies a type of the common control information and transmits the corresponding common control information to the UE 200 through the common search space corresponding to the common control information.

The UE 200 may receive common control information including scheduling information of paging for the corresponding UE 200 or a random access response based on the aforementioned various RNTIs while monitoring the common search space. Each piece of the common control information may be received through the corresponding common search space, and the UE 200 may receive a paging message or a random access response message through the scheduling information of the common control information.

As described above, the common control information may be repeatedly received through one or more subframes, and the number of repetitions may be determined according to a coverage level or a repetition level of the MTC UE.

Figure 3:
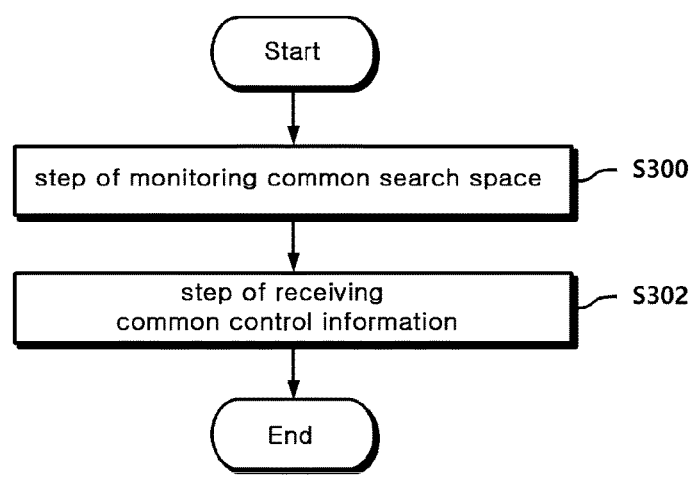
FIG. 3 is a flowchart illustrating operations of a user equipment (UE) according to an embodiment of the present disclosure.

FIG. 3 is a flowchart illustrating operations of a user equipment (UE) according to an embodiment of the present disclosure.

According to an embodiment of the present disclosure, a method of receiving control information by an MTC UE may include monitoring a common search space configured to be common control information type-specific and receiving common control information transmitted through the common search space.

Referring to FIG. 3, the method of receiving the control information by the MTC UE includes monitoring the common search space configured to be common control information-specific in S300. For example, the MTC UE monitors the common search space to receive common control information for the MTC UE. The common search space may be configured to be separated according to the common control information and may be configured to be differently separated according to the type of various pieces of common control information such as paging, random access, and system information. Specifically, the common search space may be configured to be separated for each of scheduling information of the paging and scheduling information of the random access response. In another example, the common search space may be separated and configured to be coverage level-specific or repetition level-specific. In still another example, the common search space may be configured to be cell-specific or coverage level-specific. In yet another example, the common search space may be configured to be separated according to the type of common control information and the repetitive transmission level.

For example, the common search space configured for the random access response may be configured according to each PRACH (Physical random access channel) repetitive transmission level. That is, the common search space configured for the random access response may be configured to be separated from the common search space for the paging and additionally separated and configured to be PRACH repetitive transmission level-specific. The common search space configured for the paging to be separated from that of the random access response may be configured to be cell-specific. As described above, the common search space may be configured to be separated according to the type of common control information and may be additionally configured to be further separated according to the repetitive transmission level.

Meanwhile, the MTC UE may perform operation of receiving common control information transmitted through the common search space in S302. The MTC UE may receive the common control information through the aforementioned common search space. That is, the MTC UE may receive particular common control information through a particular common search space. For example, the MTC UE may receive common control information including scheduling information of a paging message through a common search space configured for the paging and receive common control information including scheduling information of a random access response message in a common search space configured for the random access response. Additionally, the MTC UE may receive common control information including scheduling of the random access response message of the corresponding MTC UE in the common search space configured for the random access response configured to be separated according to the coverage level or the repetitive transmission level of the corresponding MTC UE.

Figure 4:
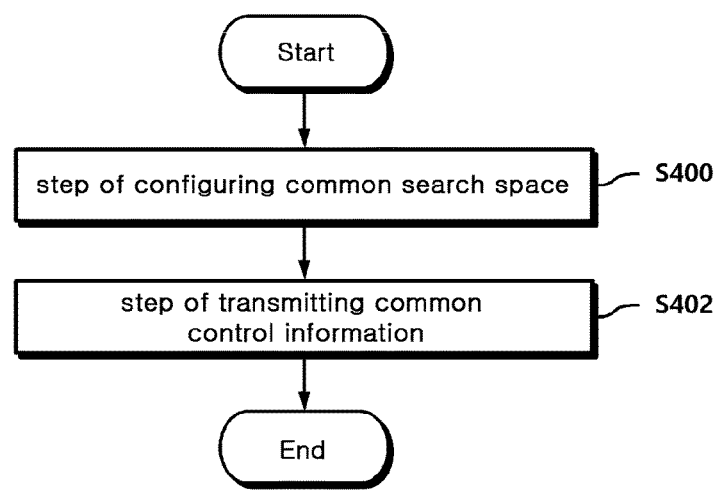
FIG. 4 is a flowchart illustrating operations of a base station (BS) according to an embodiment of the present disclosure.

FIG. 4 is a flowchart illustrating operations of a base station according to an embodiment of the present disclosure.

A method of transmitting control information by a BS according to an embodiment of the present disclosure may include configuring a common search space for common control information transmission of an MTC UE and transmitting the common control information through the common search space, and the common search space may be configured to be common control information-specific.

Referring to FIG. 4, in the method of transmitting the control information by the BS, the BE may perform operation of configuring a common search space for common control information transmission of the MTC UE in S400. The common search space may be configured to be common control information-specific. As described above with reference to FIG. 3, the common search space may be configured to be separated according to common control information and may be configured to be differently separated according to the type of various pieces of common control information such as paging, random access, and system information. Specifically, the common search space may be configured to be separated for each of scheduling information of the paging and scheduling information of the random access response. In another example, the common search space may be separated and configured to be coverage level-specific or repetition level-specific. In still another example, the common search space may be configured to be cell-specific or coverage level-specific. In yet another example, the common search space may be configured to be separated according to the type of common control information and the repetitive transmission level.

For example, the common search space configured for the random access response may be configured according to each PRACH (Physical random access channel) repetitive transmission level. That is, the common search space configured for the random access response may be configured to be separated from the common search space for the paging and additionally separated according to the PRACH repetitive transmission level. The common search space configured for the paging to be separated from that of the random access response may be configured to be cell-specific. As described above, the common search space may be configured to be separated according to the type of common control information and may be additionally configured to be further separated according to the repetitive transmission level.

Meanwhile, the BS may perform operation of transmitting common control information through the common search space in S402. The BS may transmit the common control information through the aforementioned common search space. For example, the BS may transmit common control information including scheduling information of a paging message through a common search space configured for the paging and common control information including scheduling information of a random access response message in a common search space configured for the random access response. Additionally, the BS may transmit common control information including scheduling information of the random access response message of the corresponding MTC UE in the common search space configured to the random access response configured to be separated according to each coverage level or each repetitive transmission level of the corresponding MTC UE.

As described above, the common search space for the MTC UE may be configured to be separated according to the type of the common control information or configured to be separated according to the coverage level or the repetitive transmission level of the corresponding MTC UE as necessary. Alternatively, the common search space may be configured to be cell-specific, coverage level-specific, or repetitive transmission level-specific.

Hereinafter, various embodiments for configuring the common search space for the MTC UE according to the present disclosure described with reference to FIGS. 3 and 4 will be described in more detail.

A low price MTC UE cannot receive a PDCCH transmitted through the entire system bandwidth since a reception bandwidth thereof is limited to 1.4 MHz. Accordingly, it is required to transmit a downlink control channel for the corresponding MTC UE within 6 PRBs (Physical Resource Blocks) of a PDSCH area. In this case, the EPDCCH defined in Rel 11 may be used or a separate wireless control channel for the MTC UE may be newly defined in a PDSCH area. Further, for CE (Coverage Enhancement), wireless control channel and wireless data channel transmission for a predetermined MTC UE are not performed in the unit of one subframe, but may be repeatedly performed through a plurality of subframes.

Hereinafter, various embodiments of a method of configuring a CSS for an MTC UE having a coverage enhancement function will be described.

First Embodiment 1: Method of Configuring a Separate CSS According to a Type of Common Control Information For example, the separate CSS may be defined according to a type of common control information (for example, DCI) to be monitored by the MTC UE or a type of an RNTI. That is, a paging_CSS for monitoring an M-PDCCH transmitting scheduling information of paging and an RA_CSS for monitoring an M-PDCCH transmitting scheduling information of an RAR may be separately defined. Further, a fallback_CSS for a fallback operation of a USS configured to be MTC UE-specific may be defined. Each MTC UE may monitor only an M-PDCCH scrambled with a P-RNTI in the configured paging_CSS and only an M-PDCCH scrambled with an RA-RNTI in the RA_CSS. Further, the MTC UE may monitor only an M-PDCCH scrambled with a C-RNTI of the corresponding UE in the fallback_CSS.

In another example, the fallback operation may be performed through the paging_CSS without additional definition of the facllback_CSS. That is, only the paging_CSS and the RA_CSS may be separately configured and the MTC UE may monitor only the M-PDCCH scrambled with the RA-RNTI in the RA_CSS, but may monitor the M-PDCCH scrambled with the C-RNTI of the corresponding UE as well as the M-PDCCH scrambled with the P-RNTI in the paging_CSS.

In another example, when the fallback_CSS is not additionally defined, it may be defined that the operation of the fallback_CSS is replaced with the RA_CSS or the operation of the fallback_CSS is replaced with all of the paging_CSS and the RA_CSS. That is, when it is defined that the operation of the fallback_CSS is replaced with the RA_CSS, the MTC UE may monitor only the M-PDCCH scrambled with the P-RNTI through the paging_CSS and monitor only the M-PDCCH scrambled with the RA-RNTI and the C-RNTI in the RA_CSS. When it is defined that the operation of the fallback_CSS is replaced with all of the paging_CSS and the RA_CSS, it may be defined to monitor the M-PDCCH scrambled with the P-RNTI and the C-RNTI through the paging_CSS and monitor the M-PDCCH scrambled with the RA-RNTI and the C-RNTI through the RA_CSS.

Embodiment 2: Method of Configuring a Separate CSS According to the Type of Common Control Information and the Coverage Level When the separate CSS is defined according to a type of common control information to be monitored by the MTC UE or a type of the RNTI like in the first embodiment 1, the paging_CSS may be configured to be cell common. However, each MTC UE may monitor a paging_CSS corresponding to its own paging occasion among corresponding cell common paging_CSSs based on each paging occasion.

Further, the RAR_CSS may be configured to be coverage level-specific or repetitive transmission level-specific based on a coverage level or a repetitive transmission level of the PRACH corresponding to the corresponding RAR_CSS.

In addition, when the fallback_CSS is configured, the fallback_CSS may be configured to be cell common regardless of a coverage level or a repetitive transmission level to which the corresponding MTC UE belongs or configured to be corresponding MTC UE coverage level-specific or repetitive transmission level-specific.

Third Embodiment 3: Method of Configuring CSS to be Coverage Level-Specific

When the CSS is configured for the MTC UE or the CE UE, a separate CSS may be defined to be coverage level-specific. That is, N CSSs may be defined through the PDSCH area according to respective coverage levels, such as i) MTC_CSS #0 for UEs belonging to coverage level 0, ii) MTC_CSS #1 for UEs belonging to coverage level 1, . . . , and n) MTC_CSS #(N−1) for UEs belonging to coverage level N−1. Accordingly, each MTC UE or CE UE may monitor only the MTC_CSS of the coverage level to which the corresponding MTC UE or CE UE belongs to receive common control information or UE-specific control information transmitted through the CSS.

In this case, time/frequency domain radio resources of each coverage level-specific CSS may be configured by the BS and explicitly signaled to MTC UEs within the corresponding cell through a separate MTC SIB defined for the MTC UE. Alternatively, corresponding time/frequency domain radio resource allocation may be implicitly performed. For example, the corresponding time/frequency domain radio resource allocation may be performed by a function having, as parameters, at least one of a PCID (Physical cell ID) of the corresponding cell, an SFN, a subframe (or slot) index, and a function of a corresponding coverage level. Alternatively, only some information related to the configuration of the corresponding coverage level-specific MTC_CSS may be explicitly signaled through the MTC SIB using a hybrid method and may be defined as a function having, as parameters, at least one of the PCID, the SFN, the subframe (or slot) index, and the coverage level. For example, time domain radio resource allocation information (for example, information related to duration for which one MTC_CSS for each coverage level is configured or a cycle for which the MTC_CSS is configured) may be explicitly signaled through the MTC SIB. Radio resources of the frequency domain on which the corresponding MTC_CSS is configured within the corresponding duration of the corresponding MTC_CSS configuration cycle may be determined as a function having at least one of the PCID, the SFN, the subframe (or slot) index, and the coverage level as parameters.

The embodiments were described as the method of configuring the CSS according to each coverage level. However, the present disclosure is not limited thereto. The present disclosure can be equally applied to configuring the CSS to be repetitive transmission level-specific as well as coverage level-specific. That is, in this specification, the repetitive transmission level may be defined according to the coverage level, and the coverage level and the repetitive transmission level may be described as having the same meaning as necessary.

Fourth Embodiment 4: Method of Configuring CSSs to be Separated According to Two Types As another method of the CSS configuration for the MTC UE or CE UE, two types of CSSs including a coverage-specific MTC_CSS and a cell common MTC_CSS may be defined. The MTC UE or the CE UE may monitor the corresponding two types of MTC CSSs. In this case, the cell common MTC_CSS may be configured to be always monitored by all MTC UEs or CE UEs regardless of a coverage level to which the MTC UE or the CE UE belongs. The coverage-specific MTC_CSS corresponds to the MTC_CSS separately defined according to each coverage level like in the third embodiment 3, and each MTC UE or CE UE may monitor only the coverage-specific MTC_CSS for the coverage level to which the corresponding UE belongs. That is, all MTC UEs or CE UEs may monitor each of the two types of MTC_CSSs including the coverage-specific MTC_CSS determined according to the coverage level to which the corresponding UE belongs and the cell common MTC_CSS configured to be cell common regardless of the coverage level.

Further, when the aforementioned two types of CSSs are defined, an RNTI type which the UE should monitor to receive common control information (for example, DCI) may be differently defined according to each MTC_CSS type. For example, the MTC UE or the CE UE may monitor common control information CRC-scrambled with an RA-RNTI or P-RNTI through the coverage-specific MTC_CSS and monitor common control information CRC-scrambled with an SI-RNTI and a UE-specific C-RNTI through the cell common MTC_CSS. That is, it may be defined to monitor common control information including scheduling information for an RAR message or a paging message through the coverage-specific MTC_CSS and to monitor common control information including scheduling information for an MTC SIB or a UE-specific PDSCH data channel through the cell common MTC_CSS. Alternatively, it may be defined to monitor the RA-RNTI, the P-RNTI, or the SI-RNTI through the coverage-specific MTC_CSS and to monitor common control information scrambled with the SI-RNTI and the C-RNTI through the cell common MTC_CSS. The aforementioned method of defining the CSS type-based monitoring RNTI is only an embodiment, and the cell common MTC_CSS and the coverage-specific MTC_CSS may be defined as described above and the RNTI type monitored by each MTC_CSS may be variously configured.

Meanwhile, when the cell common CSS or the coverage level-specific CSS is defined according to each of the aforementioned embodiments, time/frequency resource allocation information for the cell common CSS may be explicitly signaled through a PBCH or an MTC SIB, or implicitly determined as a function having parameters of a PCID, an SFN, a subframe (or slot) index, and some resource allocation information such as duration or a cycle may be explicitly signaled through the PBCH or SIB using a hybrid method, and frequency domain resource allocation information may be implicitly configured as a function having parameters of the PCID, SFN, and subframe index. Similarly, the coverage level-specific CSS configuration information may be also defined explicitly, implicitly, or through the hybrid method.

Further, when the cell common MTC_CSS and the coverage-specific MTC_CSS overlap on a time domain, the UE may be defined to first monitor the cell common MTC_CSS or inversely defined to first monitor the coverage-specific MTC_CSS.

The division of the cell common CSS and the CSS configured to be coverage level-specific as described above may be defined based on repetition levels of M-PDCCH candidates configured through the corresponding CSS. For example, when the CSS is configured to always include a maximum M-PDCCH repetition level supported through the corresponding cell (or when M-PDCCH candidates are configured to include the corresponding maximum M-PDCCH repetition level), the corresponding CSS may be separated as the cell common CSS. When repetition levels of M-PDCCH candidates configured according to the coverage level are differently configured, the CSS may be separated as the CSS configured to be coverage level-specific.

As described, in accordance with at least one embodiment of the present disclosure, a method and an apparatus may be provided for transmitting common control information according to each coverage enhancement level within a predetermined cell in a case of an MTC UE supporting the coverage enhancement. Further, with respect to common control information for the MTC UE, a method and an apparatus may be provided for configuring a separate common search space according the type of common control information in accordance with at least one embodiment of the present disclosure.

Hereinafter, the UE and the BS according to the embodiments of the present disclosure described above will be described with reference to FIGS. 5 and 6.

Figure 5:
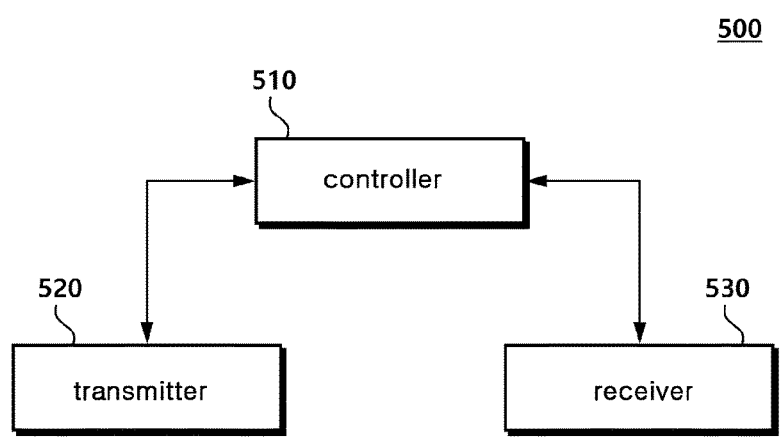
FIG. 5 is a block diagram illustrating a configuration of a user equipment (UE) according to an embodiment of the present disclosure.

FIG. 5 is a block diagram illustrating a configuration of a UE according to an embodiment of the present disclosure.

Referring to FIG. 5, an MTC UE 500 according to an embodiment of the present disclosure includes a controller 510 configured to monitor a common search space configured according to each type of common control information and a receiver 530 configured to receive common control information transmitted through the common search space.

Further, the controller 510 controls general operation of the UE 500 according to reception of downlink control information by monitoring a CSS configured according to each embodiment of the CSS configuration method for an MTC UE or a CE UE required for performing the aforementioned present disclosure.

Here, the common search space may be configured to be separated according to common control information, and the common search space may be configured to be differently separated according to a type of various pieces of common control information such as paging, random access, and system information. Specifically, the common search space may be configured to be separated according to each of scheduling information of the paging and scheduling information of the random access response. In another example, the common search space may be configured to be separated according to each coverage level or each repetition level. In still another example, the common search space may be configured to be cell-specific or coverage level-specific. In yet another example, the common search space may be configured to be separated according to the type of common control information and the repetitive transmission level. For example, the common search space configured for the random access response may be configured to be PRACH (Physical random access channel) repetitive transmission level-specific. That is, the common search space configured for the random access response may be configured to be separated from the common search space for the paging and additionally separated according to the PRACH repetitive transmission level. The common search space configured for the paging to be separated from that of the random access response may be configured to be cell-specific. As described above, the common search space may be configured to be separated according to each type of common control information and may be additionally configured to be further separated according to the repetitive transmission level.

The receiver 530 receives downlink control information, data, and a message from the BS through a corresponding channel. A transmitter 520 transmits uplink control information, data, and a message to the BS through a corresponding channel.

Figure 6:
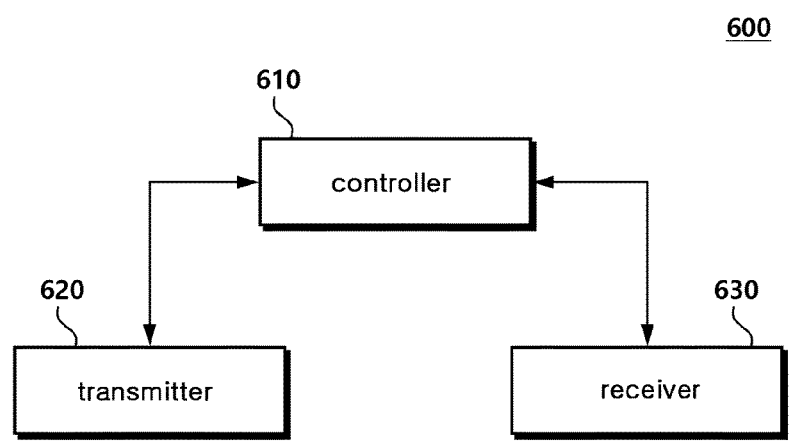
FIG. 6 is a block diagram illustrating a configuration of a base station (BS) according to an embodiment of the present disclosure.

FIG. 6 is a block diagram illustrating a configuration of a BS according to an embodiment of the present disclosure.

Referring to FIG. 6, a BS 600 according to an embodiment of the present disclosure includes a controller 610 configured to configure a common search space for transmission of common control information of the MTC UE and a transmitter 620 configured to transmit common control information through the common search space, and the common search space may be configured according to each type of the common control information.

Further, the controller 610 may configure a CSS according to each embodiment of the CSS configuration method for the MTC UE or CE UE required for performing the aforementioned present disclosure, and the controller 610 may control general operation of the BS 600 according to transmission of downlink control information through the corresponding CSS.

As described above, the common search space may be configured to be separated according to the common control information and may be configured to be differently separated according to the type of various pieces of common control information such as paging, random access, and system information. Specifically, the common search space may be configured to be separated for each of scheduling information of the paging and scheduling information of the random access response. In another example, the common search space may be configured to be separated to be coverage level-specific or repetition level-specific. In still another example, the common search space may be configured to be cell-specific or coverage level-specific. In yet another example, the common search space may be configured to be separated according to each type of common control information and each repetitive transmission level. For example, the common search space configured for the random access response may be configured to be PRACH (Physical random access channel) repetitive transmission level-specific. That is, the common search space configured for the random access response may be configured to be separated from the common search space for the paging and additionally separated according to the PRACH repetitive transmission level. The common search space configured for the paging to be separated from that of the random access response may be configured to be cell-specific. As described above, the common search space may be configured to be separated according to the type of common control information and may be additionally configured to be further separated according to the repetitive transmission level.

The transmitter 620 and a receiver 630 are used for transmitting/receiving a signal, a message, and data needed for performing the aforementioned present disclosure to/from the UE.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

The invention claimed is:

1. A method of receiving common control information by an MTC (Machine Type Communication) UE (user equipment), the method comprising:

monitoring the common control information through a common search space region for the MTC UE, wherein the common control information comprises scheduling information for paging and scheduling information for a random access response, and the common search space region includes at least one common search space separately configured according to a type of the common control information; and receiving the common control information in the common search space region, wherein the common search space region for the MTC UE includes i) a first common search space for the scheduling information for the paging and ii) a second common search space for the scheduling information for the random access response, where the second common search space is separately configured from the first search space;

wherein the monitoring of the common control information is performed by monitoring a corresponding common search space among the at least one common search space according to a type of the common control information to be received;

wherein the monitoring the common control information comprises:

monitoring the first common search space to receive the scheduling information for the paging; and monitoring the second common search space to receive the scheduling information for the random access response;

wherein the first common search space for the scheduling information for the paging is configured to be cell-specific;

wherein the second common search space for the scheduling information for the random access response is differently configured according to a PRACH (Physical Random Access Channel) repetitive transmission level and a coverage level; and wherein the differently configuring of the second common search space includes;

configuring the second common search space to be coverage level-specific when repetitive transmission levels of MPDCCH (machine type communication physical downlink control channel) candidates are differently configured according to the coverage level.

2. A method of transmitting control information by a base station, the method comprising:

configuring a common search space region for the an MTC (Machine Type Communication) UE (user equipment) for the common control information that comprises i) scheduling information for paging and ii) scheduling information for a random access response; and transmitting the common control information through the common search space region, wherein the common search space region for the MTC UE includes at least one common search space separately configured according to a type of the common control information, and includes i) a first common search space for the scheduling information for the paging and ii) a second common search space for the scheduling information for the random access response;

wherein the configuring the common search space region comprises:

configuring the first common search space for the scheduling information for the paging; and configuring the second common search space for the scheduling information for the random access response, where the second common search space is separately configured from the first search space;

wherein the transmitting includes:

determining a type of the common control information to be transmitted to the MTC UE; and transmitting the common control information through a common search space corresponding to the determined type of the common control information, among the at least one common search space;

wherein the first common search space for the scheduling information for the paging is configured to be cell-specific;

wherein the second common search space for the scheduling information for the random access response is differently configured according to a PRACH (Physical Random Access Channel) repetitive transmission level and a coverage level; and wherein the differently configuring of the second common search space includes;

configuring the second common search space to be coverage level-specific when repetitive transmission levels of MPDCCH (machine type communication physical downlink control channel) candidates are differently configured according to the coverage level.

3. An MTC (Machine Type Communication) UE (User equipment) for receiving common control information, the MTC UE comprising:

a controller configured to monitor the common control information that comprises scheduling information for paging and scheduling information for a random access response through a common search space region for the MTC UE, and the common search space region includes at least one common search space separately configured according to a type of the common control information; and a receiver configured to receive the common control information in the common search space region, wherein the common search space region for the MTC UE includes i) a first common search space for the scheduling information for the paging and ii) a second common search space for the scheduling information for the random access response, where the second common search space is separately configured from the first search space;

wherein the monitoring of the controller is performed by monitoring a corresponding common search space among the least one common search space according to a type of the common control information to be received;

wherein the controller is configured to monitor the first common search space to receive the scheduling information for the paging and to monitor the second common search space to receive the scheduling information for the random access response;

wherein the first common search space for the scheduling information for the paging is configured to be cell-specific;

wherein the second common search space for the scheduling information for the random access response is differently configured according to a PRACH (Physical Random Access Channel) repetitive transmission level and a coverage level; and wherein the differently configuring of the second common search space includes;

configuring the second common search space to be coverage level-specific when repetitive transmission levels of MPDCCH (machine type communication physical downlink control channel) candidates are differently configured according to the coverage level.

* * * * *